United States Patent
Raj et al.

(10) Patent No.: US 11,562,137 B2
(45) Date of Patent: Jan. 24, 2023

(54) SYSTEM TO CORRECT MODEL DRIFT FOR NATURAL LANGUAGE UNDERSTANDING

(71) Applicant: BANK OF AMERICA CORPORATION, Charlotte, NC (US)

(72) Inventors: Utkarsh Raj, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 207 days.

(21) Appl. No.: 16/847,895

(22) Filed: Apr. 14, 2020

(65) Prior Publication Data

US 2021/0319174 A1 Oct. 14, 2021

(51) Int. Cl.
G06F 40/216 (2020.01)
G06F 40/284 (2020.01)
G06F 40/242 (2020.01)

(52) U.S. Cl.
CPC .......... *G06F 40/216* (2020.01); *G06F 40/242* (2020.01); *G06F 40/284* (2020.01)

(58) Field of Classification Search
CPC ..... G06F 40/242; G06F 40/284; G06F 40/216
See application file for complete search history.

(56) References Cited

U.S. PATENT DOCUMENTS

| | | | |
|---|---|---|---|
| 4,761,748 A | 8/1988 | Le Rat et al. | |
| 5,210,704 A | 5/1993 | Husseiny | |
| 5,403,746 A | 4/1995 | Bentsen et al. | |
| 5,619,433 A | 4/1997 | Wang et al. | |
| 5,774,829 A | 6/1998 | Cisneros et al. | |
| 5,838,465 A | 11/1998 | Satou et al. | |
| 5,864,773 A | 1/1999 | Barna et al. | |
| 6,295,541 B1 | 9/2001 | Bodnar et al. | |
| 6,338,270 B1 | 1/2002 | Mancosu et al. | |
| 6,400,753 B1 | 6/2002 | Kohli et al. | |
| 6,574,558 B2 | 6/2003 | Kohli | |
| 6,577,952 B2 | 6/2003 | Geier et al. | |
| 6,587,744 B1 | 7/2003 | Stoddard et al. | |
| 6,629,638 B1 | 10/2003 | Sanchez | |
| 6,711,503 B2 | 3/2004 | Haaland | |
| 6,731,083 B2 | 5/2004 | Marcinkiewicz | |
| 6,735,542 B1 | 5/2004 | Burgett et al. | |
| 6,907,070 B2 | 6/2005 | Wu et al. | |
| 6,915,237 B2 | 7/2005 | Hashemian | |

(Continued)

*Primary Examiner* — Edgar X Guerra-Erazo
*Assistant Examiner* — Alexander Joongie Kim

(57) ABSTRACT

A system retrains a natural language understanding (NLU) model by regularly analyzing electronic documents including web publications such as online newspapers, blogs, social media posts, etc. to understand how word and phrase usage is evolving. Generally, the system determines the frequency of words and phrases in the electronic documents and updates an NLU dictionary depending on whether certain words or phrases are being used more frequently or less frequently. This dictionary is then used to retrain the NLU model, which is then applied to predict the meaning of text or speech communicated by a people group. By analyzing electronic documents such as web publications, the system is able to stay up-to-date on the vocabulary of the people group and make correct predictions as the vocabulary changes (e.g., due to natural disaster). In this manner, the safety of the people is improved.

11 Claims, 3 Drawing Sheets

(56) References Cited

U.S. PATENT DOCUMENTS

| | | |
|---|---|---|
| 6,917,839 B2 | 7/2005 | Bickford |
| 7,007,551 B2 | 3/2006 | Zdeblick et al. |
| 7,200,524 B2 | 4/2007 | Kang et al. |
| 7,346,469 B2 | 3/2008 | Aware et al. |
| 7,363,099 B2 | 4/2008 | Smith et al. |
| 7,587,296 B2 | 9/2009 | Harvey, Jr. et al. |
| 7,630,950 B2 | 12/2009 | Wang et al. |
| 7,706,571 B2 | 4/2010 | Das et al. |
| 7,710,822 B2 | 5/2010 | Harmon |
| 7,764,714 B2 | 7/2010 | Monier et al. |
| 7,800,779 B2 | 9/2010 | Fan et al. |
| 7,812,305 B2 | 10/2010 | Miller et al. |
| 7,817,469 B2 | 10/2010 | Avraham et al. |
| 8,134,499 B2 | 3/2012 | Wang et al. |
| 8,578,246 B2 | 11/2013 | Mittelholzer et al. |
| 8,582,807 B2 | 11/2013 | Yang et al. |
| 8,665,645 B2 | 3/2014 | Avraham et al. |
| 8,756,001 B2 | 6/2014 | Georgy et al. |
| 9,191,380 B2 | 11/2015 | Anderson et al. |
| 9,285,222 B2 | 3/2016 | Waite et al. |
| 9,801,575 B2 | 10/2017 | Bohm et al. |
| 10,163,061 B2 | 12/2018 | Grove et al. |
| 10,261,594 B2 | 4/2019 | Marcolina et al. |
| 2002/0123951 A1 | 9/2002 | Olsen et al. |
| 2008/0195940 A1* | 8/2008 | Gail .................. G06F 40/242 704/9 |
| 2015/0081281 A1* | 3/2015 | Bustelo ............. G06F 40/284 704/10 |
| 2021/0124880 A1* | 4/2021 | Li ..................... G06N 20/00 |
| 2021/0272040 A1* | 9/2021 | Johnson ............. G10L 25/24 |

* cited by examiner

SYSTEM TO CORRECT MODEL DRIFT FOR NATURAL LANGUAGE UNDERSTANDING

TECHNICAL FIELD

This disclosure relates generally to natural language understanding.

BACKGROUND

Natural language understanding refers to the ability of machines to understand the meaning of textual and/or spoken sentences and paragraphs.

SUMMARY OF THE DISCLOSURE

Natural language understanding (NLU) or natural language interpretation (NLI) is a subtopic of natural language processing in machine learning and artificial intelligence (AI) that deals with machine comprehension of human languages in spoken and/or textual forms. Natural language understanding is considered an AI-hard problem. There is considerable commercial interest in the field because of its application to automated reasoning machine translation, question answering, newsgathering, text categorization, voice activation, archiving, and largescale content analysis. The umbrella term "natural language understanding" can be applied to a diverse set of computer applications, ranging from small, relatively simple tasks such as short commands issued to robots, to highly complex endeavors such as the full comprehension of newspaper articles or literary passages. Many real-world applications fall between the two extremes. For instance, text classification for the automatic analysis of emails and their routing to a suitable department in a corporation does not require in-depth understanding of the text but needs to deal with a much larger vocabulary and more diverse syntax than the management of simple queries to database tables with fixed schemata.

The basic premise of any probabilistic machine learning model, including NLU and NLP, is that we can use historic data to predict the future. Unfortunately, the predictability of machine learning models using historic data diminishes with time. This phenomenon is often referred to as model drift or concept drift. As a result of model drift or concept drift, the statistical properties of the target variable (e.g., the predicted meaning of text) changes over time in unforeseen ways. This causes problems because the predictions become less accurate as time passes.

To prevent deterioration in prediction accuracy because of concept drift or model drift, both active and passive solutions can be adopted. Active solutions rely on triggering mechanisms (e.g., change-detection tests to explicitly detect concept drift as a change in the statistics of the data-generating process). In stationary conditions, any fresh information made available can be integrated to improve the model. When concept drift is detected, the current model is considered outdated and should be substituted with a new one to maintain prediction accuracy. On the other hand, passive solutions continuously update the model (e.g., by retraining the model on the most recently observed samples or enforcing an ensemble of classifiers).

It is difficult to avoid concept or model drift for complex phenomena that are not governed by fixed laws of nature. Processes that arise from human activity, such as socioeconomic processes, and biological processes are likely to experience concept drift. Therefore, periodic retraining, also known as refreshing, of any model is desirable. The value of a model in machine learning depends on its predictability and the accuracy of its predictions. The predictions of a machine learning model are often used in making decisions that impact the well-being of many individuals. The consequences of a wrong and erroneous prediction are very high, and can sometimes, be deadly. As NLU-based systems are becoming more and more ubiquitous, it is important that an NLU-based model maintains its accuracy over a long period of time.

Model drift in an NLU system may occur when an unexpected, external force impacts a population. For example, when a natural disaster strikes, the vocabulary and speech of a people group may undergo changes. New words and phrases may come into use in responding to the natural disaster. Additionally, certain words or phrases may stop being used (e.g., as portions of the people group die off or as certain concepts and ideas become less relevant to the lives of the people). Furthermore, certain words or phrases may acquire new meanings as circumstances change for the population. If the NLU system does not account for these changes as the people use the NLU system to respond to the disaster, then the NLU system may make incorrect predictions, which could result in improper treatment being applied and/or supplies being sent to incorrect locations.

This disclosure contemplates a system that retrains an NLU model by regularly analyzing currently available electronic documents such as internal documents and external documents including web publications such as online newspapers, blogs, social media posts, etc. to understand how word and phrase usage is evolving. Generally, the system determines the frequency of words and phrases in the currently available electronic documents including web publications and updates an NLU dictionary depending on whether certain words or phrases are being used more frequently or less frequently. This dictionary is then used to retrain the NLU model, which is then applied to predict the meaning of text or speech communicated by a people group. By analyzing currently available electronic documents including web publications, the system is able to stay up-to-date on the vocabulary of the people group and make correct predictions as the vocabulary changes (e.g., due to natural disaster). In this manner, the safety of the people is improved. Certain embodiments are described below.

According to an embodiment, an apparatus includes a memory and a hardware processor communicatively coupled to the memory. The hardware processor receives an electronic document and determines a number of occurrences of a first one or more words in the electronic document. The processor also updates a stored frequency of the first one or more words based on the determined number of occurrences and compares the frequency to a first threshold. In response to determining that the frequency exceeds the first threshold, the processor adds the first one or more words to a dictionary for a natural language understanding process. The processor uses the dictionary and the natural language understanding process to determine a meaning of a portion of the electronic document.

According to another embodiment, a method includes receiving, by a hardware processor communicatively coupled to a memory, an electronic document and determining, by the processor, a number of occurrences of a first one or more words in the electronic document. The method also includes updating, by the processor, a stored frequency of the first one or more words based on the determined number of occurrences and comparing, by the processor, the frequency to a first threshold. The method further includes in response to determining that the frequency exceeds the first threshold, adding, by the processor, the first one or more words to a dictionary for a natural language understanding process and using, by the processor, the dictionary and the natural language understanding process to determine a meaning of a portion of the electronic document.

According to another embodiment, a system includes a device and a model drift correction tool. The tool includes a hardware processor communicatively coupled to a memory. The hardware processor receives an electronic document and determines a number of occurrences of a first one or more words in the electronic document. The processor also updates a stored frequency of the first one or more words based on the determined number of occurrences and compares the frequency to a first threshold. In response to determining that the frequency exceeds the first threshold, the processor adds the first one or more words to a dictionary for a natural language understanding process. The processor further uses the dictionary and the natural language understanding process to determine a meaning of a message provided by the device.

Certain embodiments provide one or more technical advantages. For example, an embodiment analyzes electronic documents such as web publications to retrain an NLU system, which improves the accuracy of the system's predictions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
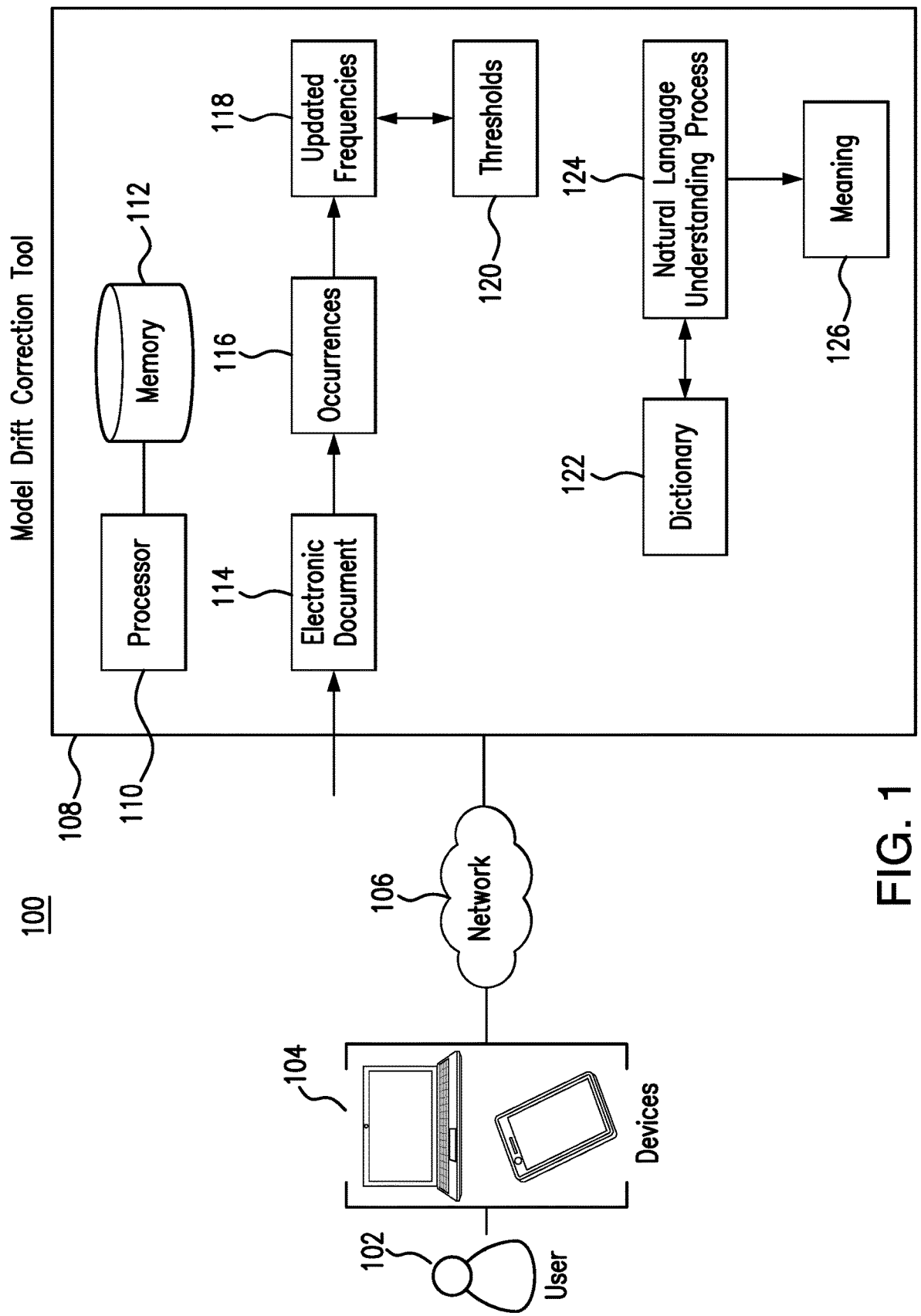
FIG. 1 illustrates an example system.
Figure 2:
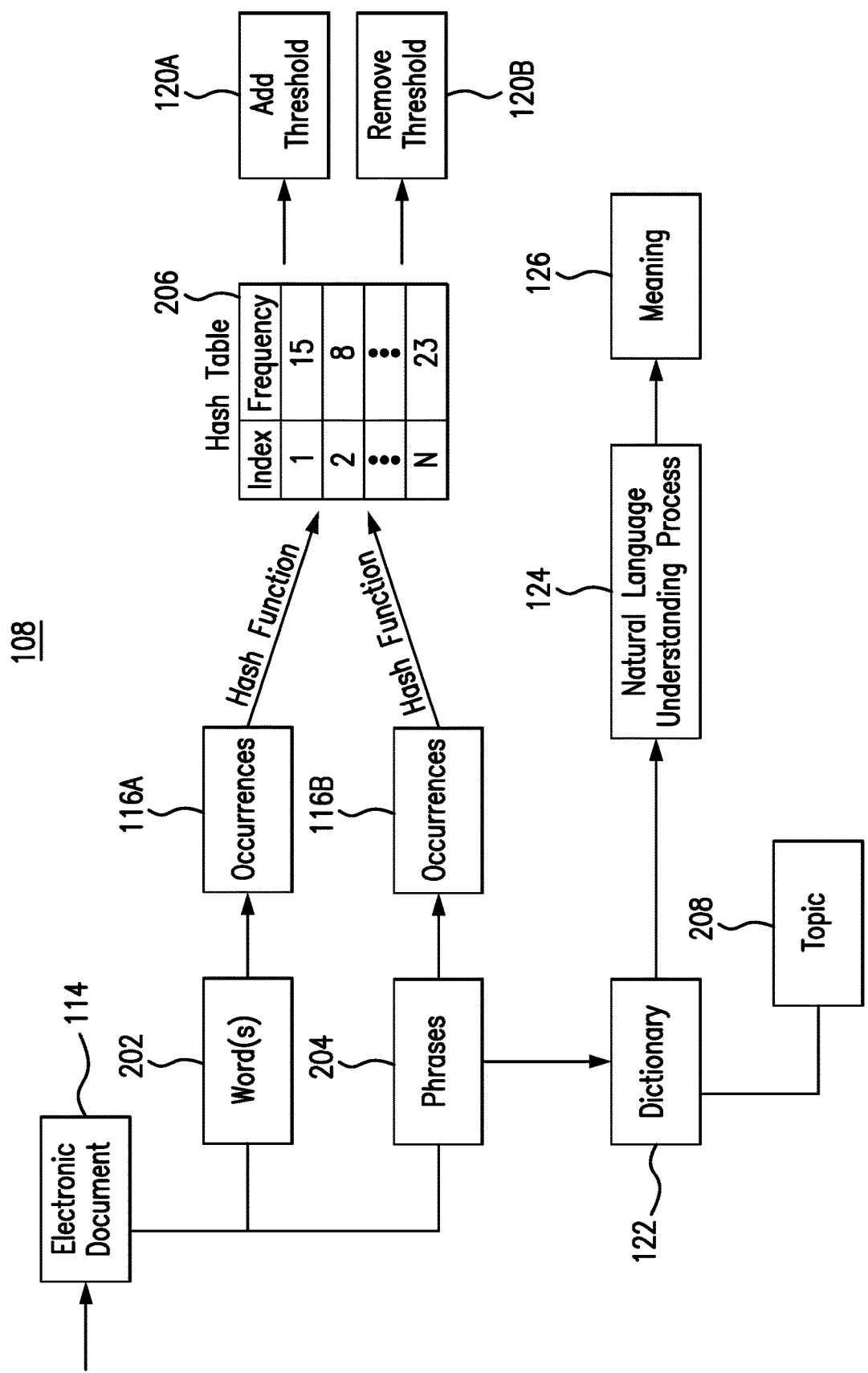
FIG. 2 illustrates an example model drift correction tool of the system of FIG. 1.
Figure 3:
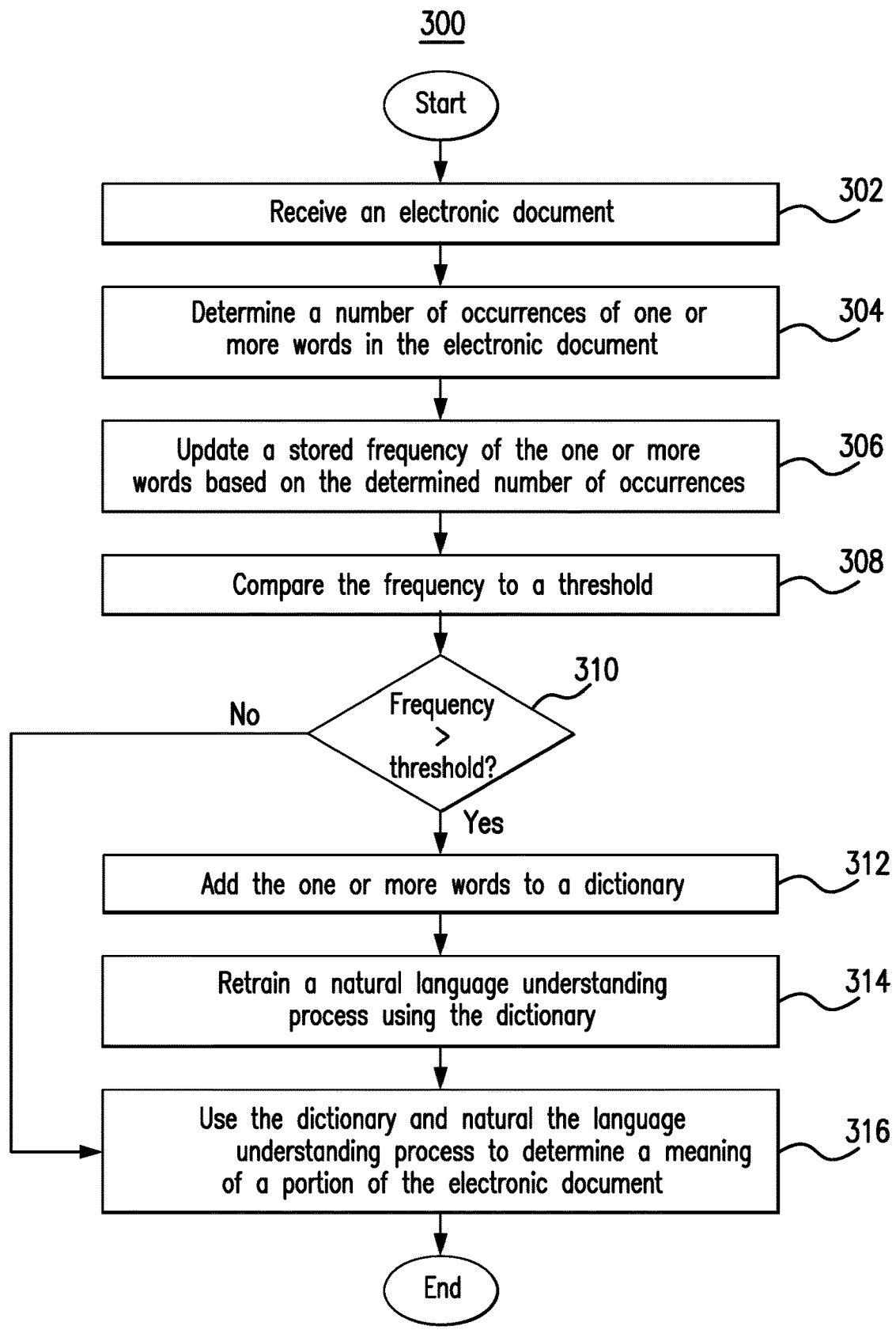
FIG. 3 is a flowchart illustrating a method for retraining a natural language understanding process using the system of FIG. 1.

Embodiments of the present disclosure and its advantages are best understood by referring to FIGS. 1 through 3 of the drawings, like numerals being used for like and corresponding parts of the various drawings.

Natural language understanding (NLU) or natural language interpretation (NLI) is a subtopic of natural language processing in machine learning and artificial intelligence (AI) that deals with machine comprehension of human languages in spoken and/or textual forms. Natural language understanding is considered an AI-hard problem. There is considerable commercial interest in the field because of its application to automated reasoning machine translation, question answering, newsgathering, text categorization, voice activation, archiving, and largescale content analysis. The umbrella term "natural language understanding" can be applied to a diverse set of computer applications, ranging from small, relatively simple tasks such as short commands issued to robots, to highly complex endeavors such as the full comprehension of newspaper articles or literary passages. Many real-world applications fall between the two extremes. For instance, text classification for the automatic analysis of emails and their routing to a suitable department in a corporation does not require in-depth understanding of the text but needs to deal with a much larger vocabulary and more diverse syntax than the management of simple queries to database tables with fixed schemata.

The basic premise of any probabilistic machine learning model, including NLU and NLP, is that we can use historic data to predict the future. Unfortunately, the predictability of machine learning models using historic data diminishes with time. This phenomenon is often referred to as model drift or concept drift. As a result of model drift or concept drift, the statistical properties of the target variable (e.g., the predicted meaning of text) changes over time in unforeseen ways. This causes problems because the predictions become less accurate as time passes.

To prevent deterioration in prediction accuracy because of concept drift or model drift, both active and passive solutions can be adopted. Active solutions rely on triggering mechanisms (e.g., change-detection tests to explicitly detect concept drift as a change in the statistics of the data-generating process). In stationary conditions, any fresh information made available can be integrated to improve the model. When concept drift is detected, the current model is considered outdated and should be substituted with a new one to maintain prediction accuracy. On the other hand, passive solutions continuously update the model (e.g., by retraining the model on the most recently observed samples or enforcing an ensemble of classifiers).

It is difficult to avoid concept or model drift for complex phenomena that are not governed by fixed laws of nature. Processes that arise from human activity, such as socioeconomic processes, and biological processes are likely to experience concept drift. Therefore, periodic retraining, also known as refreshing, of any model is desirable. The value of a model in machine learning depends on its predictability and the accuracy of its predictions. The predictions of a machine learning model are often used in making decisions that impact the well-being of many individuals. The consequences of a wrong and erroneous prediction are very high, and can sometimes, be deadly. As NLU-based systems are becoming more and more ubiquitous, it is important that an NLU-based model maintains its accuracy over a long period of time.

Model drift in an NLU system may occur when an unexpected, external force impacts a population. For example, when a natural disaster strikes, the vocabulary and speech of a people group may undergo changes. New words and phrases may come into use in responding to the natural disaster. Additionally, certain words or phrases may stop being used (e.g., as portions of the people group die off or as certain concepts and ideas become less relevant to the lives of the people). Furthermore, certain words or phrases may acquire new meanings as circumstances change for the population. If the NLU system does not account for these changes as the people use the NLU system to respond to the disaster, then the NLU system may make incorrect predictions, which could result in improper treatment being applied and/or supplies being sent to incorrect locations.

This disclosure contemplates a system that retrains an NLU model by regularly analyzing currently available electronic documents such as internal documents and external documents including web publications such as online newspapers, blogs, social media posts, etc. to understand how word and phrase usage is evolving. Generally, the system determines the frequency of words and phrases in the currently available electronic documents including web publications and updates an NLU dictionary depending on whether certain words or phrases are being used more frequently or less frequently. This dictionary is then used to retrain the NLU model, which is then applied to predict the meaning of text or speech communicated by a people group. By analyzing currently available electronic documents including web publications, the system is able to stay up-to-date on the vocabulary of the people group and make correct predictions as the vocabulary changes (e.g., due to natural disaster). In this manner, the safety of the people is improved.

A practical application of the system is that the system includes a model drift correction tool that improves the accuracy of the predictions made by an NLU system. By improving accuracy, the NLU system makes more accurate determinations of the meanings of spoken or textual messages. During a natural disaster, more accurate determinations of meaning improve the safety of users whereas less accurate determinations hurt the safety of users. The system will be described in more detail using FIGS. 1 through 3.

FIG. 1 illustrates an example system 100. As seen in FIG. 1, system 100 includes one or more devices 104 of a user 102, a network 106, and a model drift correction tool 108. Generally, model drift correction tool 108 analyzes word and phrase usage in electronic documents including web publications such as newspapers, blogs, and social media posts to retrain a natural language understanding process. In certain embodiments, by retraining the natural language understanding process in this manner, the natural language understanding process makes more accurate predictions for the meaning of text and/or speech, which improves the safety of user 102.

User 102 uses devices 104 to communicate with other components of system 100, such as model drift correction tool 108 and the natural language understanding process. For example, user 102 may speak or type into devices 104. Devices 104 may then apply the natural language understanding process to that speech to determine a meaning of that speech. Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example, and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Model drift correction tool 108 analyzes electronic documents including web publications, such as newspapers, blogs, and/or social media posts to determine changes in word or phrase usage. Model drift correction tool 108 then retrains a natural language understanding process based on the determined changes in word or phrase usage. As seen in FIG. 1, model drift correction tool 108 includes a processor 110 and a memory 112. Processor 110 and memory 112 may be configured to perform any of the functions of model drift correction tool 108 described herein. In certain embodiments, model drift correction tool 108 improves the safety of user 102 by retraining the natural language understanding process to make more accurate predictions of the meaning of speech and/or text.

Processor 110 is any electronic circuitry, including, but not limited to microprocessors, application specific integrated circuits (ASIC), application specific instruction set processor (ASIP), and/or state machines, that communicatively couples to memory 112 and controls the operation of model drift correction tool 108. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of model drift correction tool 108 by processing information received from devices 104, network 106, and memory 112. Processor 110 may be a programmable logic device, a microcontroller, a microprocessor, any suitable processing device, or any suitable combination of the preceding. Processor 110 is not limited to a single processing device and may encompass multiple processing devices.

Memory 112 may store, either permanently or temporarily, data, operational software, or other information for processor 110. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 110 to perform one or more of the functions described herein.

Model drift correction tool 108 receives an electronic document 114 such as a web publication that may be any suitable publication on the internet. For example, electronic document 114 may be an online newspaper, a blog, a social media post, and/or a website. Generally, model drift correction tool 108 may receive recently published electronic documents 114 so that model drift correction tool 108 can analyze the most up-to-date usage of words and/or phrases.

In this manner, if a recent event impacts a population's vocabulary, then electronic document 114 will reveal the changes caused by the event.

Model drift correction tool 108 analyzes electronic document 114 to determine changes in word or phrase usage. Generally, model drift correction tool 108 determines the usage frequencies of words or phrases in electronic document 114. Model drift correction tool 108 counts the number of occurrences 116 of particular words and/or phrases in electronic document 114. Then, based on these occurrences 116, model drift correction tool 108 updates stored frequencies of these words and/or phrases to produce updated frequencies 118. Updated frequencies 118 reflect an up-to-date evaluation of the frequency of usage of certain words and/or phrases in the vocabulary. If a word or phrase is being used more often, then the updated frequency 118 for that word or phrase increases. If a word or phrase is being used less, then the updated frequency 118 for that word or phrase decreases.

Model drift correction tool 108 then evaluates updated frequencies 118 to determine whether a natural language understanding process should be retrained. Generally, model drift correction tool 108 compares updated frequencies 118 to one or more thresholds 120 to determine whether certain words and/or phrases should be added or removed from a dictionary 122. For example, if an updated frequency 118 for a word or phrase exceeds a particular threshold 120, model drift correction tool 108 may determine that that the word or phrase should be added to dictionary 122. If an updated frequency 118 for a word or phrase falls below a threshold 120, model drift correction tool 108 may determine that that the word or phrase should be removed from dictionary 122. In this manner, model drift correction tool 108 maintains and/or updates dictionary 122 to reflect an up-to-date vocabulary of words and/or phrases that are being used.

Model drift correction tool 108 then uses dictionary 122 to retrain a natural language understanding process 124. By retraining natural language understanding process 124, model drift correction tool 108 updates the natural language understanding process 124 to accommodate changes to the vocabulary and/or dictionary 122. In this manner, natural language understanding process 124 is able to make more accurate predictions as to the meanings of words and/or phrases. Model drift correction tool 108 then applies the natural language understanding process 124 to speech and/or text, such as, for example, electronic document 114 and/or a spoken or textual message provided by device 104. The natural language understanding process 124 determines and/or predicts a meaning 126 of the speech or text when the natural language understanding process 124 is applied. The accuracy of the predicted meaning may impact the safety of user 102.

For example, during a natural disaster, user 102 may speak into device 104 a plea for help or supplies. Natural language understanding process 124 may be called upon to interpret what user 102 spoke into device 104. If natural language understanding process 124 incorrectly the predicts the meaning of what user 102 spoke into device 104, then improper treatment may be administered to user 102, improper supplies may be sent, or supplies and help may be sent to an improper location. By retraining natural language understanding process 124 to make more accurate predictions as to the meaning 126 of speech and/or text, model drift correction tool 108 improves the safety of user 102 in certain embodiments.

FIG. 2 illustrates an example model drift correction tool 108 of the system 100 of FIG. 1. As seen in FIG. 2, model drift correction tool 108 analyzes electronic documents 114 including web publications to retrain a natural language understanding process 124. By using electronic documents 114 to retrain natural language understanding process 124, natural language understanding process 124 is able to stay up-to-date with word and phrase usage, thereby making more accurate predictions. As a result, the safety of a user 102 is improved, because the speech or text of that user is more accurately understood.

Model drift correction tool 108 receives electronic document 114, as discussed previously. Electronic document 114 may be any online publication such as for example, an online newspaper, a blog, a social media post, and/or a website. Model drift correction tool 108 analyzes electronic document 114 by determining one or more words 202 and phrases 204 in electronic document 114. Model drift correction tool 108 then counts the number of occurrences 116 of the one or more words 202 and phrases 204. Model drift correction tool 108 determines the number of occurrences 116A of one or more words 202. Additionally, model drift correction tool 108 determines the number of occurrences 116B of one or more phrases 204.

Model drift correction tool 108 then updates the frequencies of the one or more words 202 and one or more phrases 204. Model drift correction tool 108 uses a hash table 206 to quickly and efficiently update frequencies for words 202 and phrases 204. Generally, model drift correction tool 108 applies a hash function on words 202 and phrases 204. The hash function produces a unique result for each word 202 and/or phrase 204. The result reflects an index in hash table 206. Thus, different words 202 and/or phrases 204 produce a different index when passed through the hash function. Hash table 206 also stores the frequency for each index. Thus, hash table 206 stores the frequencies of particular words 202 and/or phrases 204. By using the hash function and hash table 206, model drift correction tool 108 can quickly update the frequency of a word 202 or phrase 204 without searching through large sections of hash table 206, which improves the speed at which the frequencies of words 202 and/or phrases 204 are updated.

Model drift correction tool 108 then compares the updated frequencies in hash table 206 with one or more thresholds 120. In the illustrated example of FIG. 2, model drift correction tool 108 compares the updated frequencies in hash table 206 with an add threshold 120A and a remove threshold 120B. If the updated frequency of one or more words 202 or phrases 204 exceeds add threshold 120A, then model drift correction tool 108 may add that the one or more words 202 or phrases 204 to dictionary 122. If an updated frequency of the one or more words 202 or phrases 204 is below remove threshold 120B, then model drift correction tool 108 may determine that the one or more words 202 or phrases 204 should be removed from dictionary 122. Generally, add threshold 120A is higher than remove threshold 120B. Thus, it is easier for words 202 and phrases 204 to be added to dictionary 122 than it is for them to be removed from dictionary 122. By using thresholds 120, model drift correction tool 108 can determine when certain words 202 or phrases 204 become part of a vocabulary and/or when these words 202 and phrases 204 leave the vocabulary.

In certain embodiments, dictionary 122 may be organized by topics 208. Model drift correction tool 108 may determine a topic 208 for each word 202 or phrase 204 that is being added to dictionary 122. Model drift correction tool 108 may add words 202 and phrases 204 to certain portions of dictionary 122 corresponding to their respective topics 208. In this manner, it is easier to find words 202 and phrases 204 that are used frequently when discussing a common topic 208.

Model drift correction tool 108 retrains a natural language understanding process 124 using the updated dictionary 122. By retraining the natural language understanding process 124, the natural language understanding process 124 may more accurately predict the meaning 126 of speech and/or text because the dictionary 122 is kept up to date with word or phrase usage. In certain embodiments, because natural language understanding process 124 can more accurately predict the meaning 126 of words and/or phrases, the safety of a user 102 is improved (e.g., during a natural disaster). Model drift correction tool 108 may then use the natural language understanding process 124 to interpret portions of electronic documents 114 and/or a spoken or textual message provided by device 104.

FIG. 3 is a flow chart illustrating a method 300 for retraining a natural language understanding process using the system 100 of FIG. 1. Generally, processor 110 of model drift correction tool 108 performs the steps of method 300. In certain embodiments, by performing method 300, a natural language understanding process can more accurately predict the meaning of speech and/or text, which improves the safety of a user 102.

Model drift correction tool 108 begins by receiving an electronic document 114 such as a web publication in step 302. Electronic document 114 may be any suitable online publication such as for example, an online newspaper, a blog, a social media post, and/or a website. In step 304, model drift correction tool 108 determines a number of occurrences 116 of one or more words 202 in electronic document 114. In certain embodiments, model drift correction tool 108 also determines a number of occurrences 116 of one or more phrases 204 in electronic document 114. Model drift correction tool 108 then updates a stored frequency 118 of the one or more words 202 or phrases 204 based on the determined number of occurrences 116. In certain embodiments, model drift correction tool 108 may update the stored frequency using a hash table 206.

In step 308, model drift correction tool 108 compares the frequency of the one or more words 202 or phrases 204 to a threshold 120. In step 310, model drift correction tool 108 determines whether that frequency is greater than the threshold 120. If the frequency is greater than the threshold 120, then model drift correction tool 108 determines that the word 202 or phrase 204 should be added to a dictionary 122. In step 312, model drift correction tool 108 adds the one or more words 202 to a dictionary 122. In step 314, model drift correction tool 108 retrains a natural language understanding process 124 using the updated dictionary 122. Model drift correction tool 108 then uses the dictionary 122 and the natural language understanding process 124 to determine a meaning 126 of a portion of the electronic document 114. If model drift correction tool 108 determines that the frequency does not exceed the threshold in step 310, model drift correction tool 108 may proceed to step 316.

Modifications, additions, or omissions may be made to method 300 depicted in FIG. 3. Method 300 may include more, fewer, or other steps. For example, steps may be performed in parallel or in any suitable order. While discussed as model drift correction tool 108 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a hash table, the hash table comprising a plurality of indices and a plurality of frequencies, each frequency of the plurality of frequencies is assigned to an index of the plurality of indices; and
a hardware processor communicatively coupled to the memory, the hardware processor configured to:
receive an electronic document;
determine a number of occurrences of a first one or more words in the electronic document;
update a stored frequency of the first one or more words based on the determined number of occurrences by:
applying a hash function to the first one or more words to produce an index for the first one or more words, the index for the first one or more words is in the plurality of indices; and
updating a frequency of the plurality of frequencies assigned to the index for the first one or more words based on the number of occurrences of the first one or more words;
compare the frequency to a first threshold;
in response to determining that the frequency exceeds the first threshold, add the first one or more words to a dictionary for a natural language understanding process;
retrain the natural language understanding process with the dictionary after the first one or more words is added to the dictionary; and
use the dictionary having the one or more added words and the retrained natural language understanding process to determine a meaning of a portion of the electronic document;
wherein the processor is further configured to:
determine a number of occurrences of a second one or more words in the electronic document;
update a stored frequency of the second one or more words based on the determined number of occurrences of the second one or more words;
compare the frequency of the second one or more words to a second threshold; and
in response to determining that the frequency of the second one or more words is below the second threshold, remove the second one or more words from the dictionary.

2. The apparatus of claim 1, wherein the second threshold is below the first threshold.

3. The apparatus of claim 1, wherein the processor is further configured to:
determine a topic of the first one or more words; and
assign the first one or more words to the topic in the dictionary.

4. The apparatus of claim 1, wherein the processor is further configured to:
determine a number of occurrences of a phrase in the electronic document;
update a stored frequency of the phrase based on the determined number of occurrences of the phrase;
compare the frequency of the phrase to the first threshold; and in response to determining that the frequency of the phrase exceeds the first threshold, add the phrase to the dictionary.

5. A method comprising:

receiving, by a hardware processor communicatively coupled to a memory, an electronic document, wherein the memory stores a hash table, the hash table comprising a plurality of indices and a plurality of frequencies, each frequency of the plurality of frequencies is assigned to an index of the plurality of indices;

determining, by the processor, a number of occurrences of a first one or more words in the electronic document;

updating, by the processor, a stored frequency of the first one or more words based on the determined number of occurrences by:

applying a hash function to the first one or more words to produce an index for the first one or more words, the index for the first one or more words is in the plurality of indices; and updating a frequency of the plurality of frequencies assigned to the index for the first one or more words based on the number of occurrences of the first one or more words;

comparing, by the processor, the frequency to a first threshold;

in response to determining that the frequency exceeds the first threshold, adding, by the processor, the first one or more words to a dictionary for a natural language understanding process;

retraining the natural language understanding process with the dictionary after the first one or more words is added to the dictionary; and using, by the processor, the dictionary having the one or more added words and the retrained natural language understanding process to determine a meaning of a portion of the electronic document;

determining, by the processor, a number of occurrences of a second one or more words in the electronic document;

updating, by the processor, a stored frequency of the second one or more words based on the determined number of occurrences of the second one or more words;

comparing, by the processor, the frequency of the second one or more words to a second threshold; and in response to determining that the frequency of the second one or more words is below the second threshold, removing, by the processor, the second one or more words from the dictionary.

6. The method of claim 5, wherein the second threshold is below the first threshold.

7. The method of claim 5, further comprising:
determining, by the processor, a topic of the first one or more words; and
assigning, by the processor, the first one or more words to the topic in the dictionary.

8. The method of claim 5, further comprising:
determining, by the processor, a number of occurrences of a phrase in the electronic document;
updating, by the processor, a stored frequency of the phrase based on the determined number of occurrences of the phrase;

comparing, by the processor, the frequency of the phrase to the first threshold; and in response to determining that the frequency of the phrase exceeds the first threshold, adding, by the processor, the phrase to the dictionary.

9. A system comprising:

a device; and a model drift correction tool comprising a hardware processor communicatively coupled to a memory, the memory configured to store a hash table, the hash table comprising a plurality of indices and a plurality of frequencies, each frequency of the plurality of frequencies is assigned to an index of the plurality of indices;

the hardware processor configured to:

receive an electronic document;

determine a number of occurrences of a first one or more words in the electronic document;

update a stored frequency of the first one or more words based on the determined number of occurrences by:

applying a hash function to the first one or more words to produce an index for the first one or more words, the index for the first one or more words is in the plurality of indices; and updating a frequency of the plurality of frequencies assigned to the index for the first one or more words based on the number of occurrences of the first one or more words;

compare the frequency to a first threshold;

in response to determining that the frequency exceeds the first threshold, add the first one or more words to a dictionary for a natural language understanding process;

retrain the natural language understanding process with the dictionary after the first one or more words is added to the dictionary; and use the dictionary having the one or more added words and the retrained natural language understanding process to determine a meaning of a message provided by the device;

wherein the processor is further configured to:

determine a number of occurrences of a second one or more words in the electronic document;

update a stored frequency of the second one or more words based on the determined number of occurrences of the second one or more words;

compare the frequency of the second one or more words to a second threshold; and in response to determining that the frequency of the second one or more words is below the second threshold, remove the second one or more words from the dictionary.

10. The system of claim 9, wherein the second threshold is below the first threshold.

11. The system of claim 9, wherein the processor is further configured to:
determine a topic of the first one or more words; and
assign the first one or more words to the topic in the dictionary.

* * * * *